Nov. 1, 1927.
A. E. L. SCANES
1,647,314
ELECTRICAL TRANSFORMER
Filed May 22, 1924
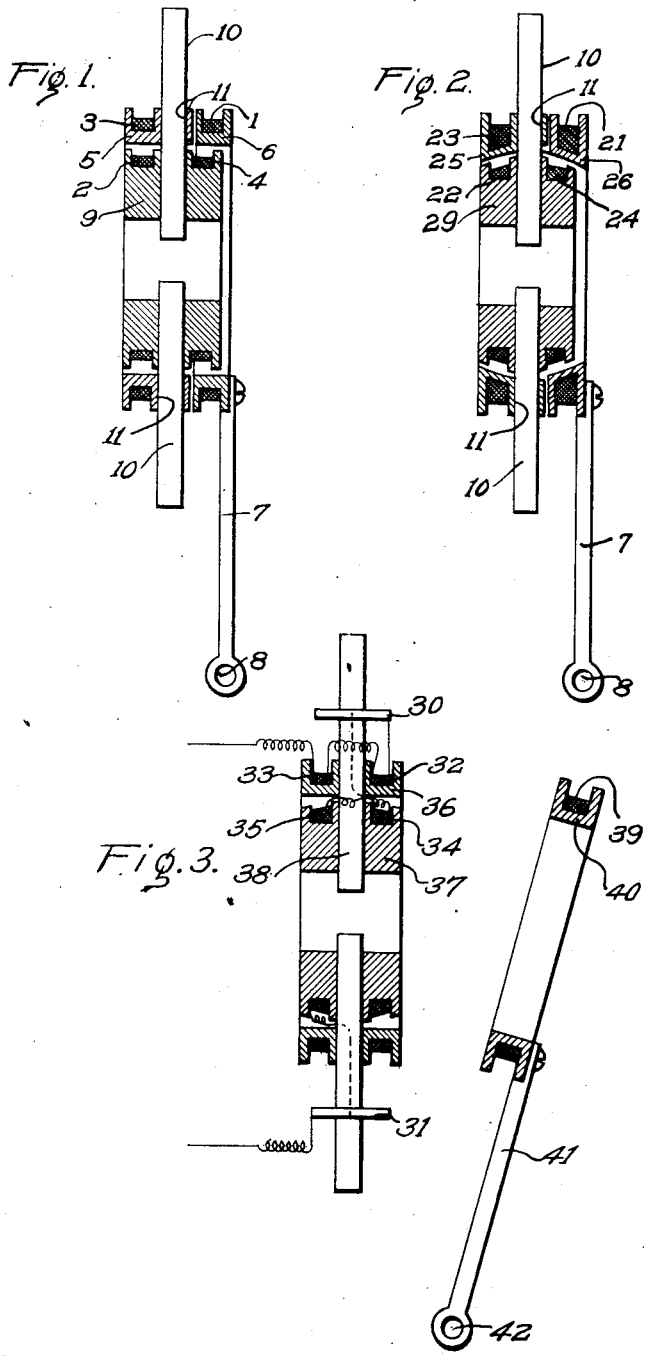
WITNESSES:
INVENTOR
Arthur Edwin Leigh Scanes.
BY
ATTORNEY Patented Nov. 1, 1927.

1,647,314

UNITED STATES PATENT OFFICE.

ARTHUR EDWIN LEIGH SCANES, OF STRATHFIELD, ENGLAND, ASSIGNOR, BY MESNE ASSIGNMENTS, TO METROPOLITAN-VICKERS ELECTRICAL COMPANY, LIMITED, A BRITISH JOINT-STOCK COMPANY.

ELECTRICAL TRANSFORMER.

Application filed May 22, 1924, Serial No. 715,034, and in Great Britain June 4, 1923.

This invention relates to transformers and particularly to transformers intended for use with currents of high or intermediate frequency such as occur in a radio receiving system in the stages of amplification which precede the audio frequency.

It is an object of this invention to provide a transformer of the class described in which the inductance in the primary and secondary windings may be simultaneously varied.

It is a further object of this invention to cause simultaneously the same proportionate variation of the inductance in each winding whereby a predetermined relation between the two inductances may be maintained.

It is a further object of this invention to provide a transformer of adjustable inductance with means for varying the coupling between the primary and the secondary.

It is a further object of this invention to provide an arrangement for varying the inductance in the two windings without altering the coupling, and for altering the coupling without altering the inductance, to any considerable extent.

It is a further object of this invention to provide a transformer having its windings apportioned between a rotor and a stator, a part of each winding being upon each of said elements.

It is a still further object of this invention to provide a transformer having a rotor and a stator and to so mount a part of the stator that it may be moved relative to the remainder of the stator.

Other objects of the invention and details of the structure will be clear from the following description and the accompanying drawings in which:

Figure 1 is a view in axial section of one form of the invention,

Fig. 2 is a similar view of a modification, and,

Fig. 3 is a similar view of a further modification.

The transformer has a primary winding which is divided into two coils, 1 and 2, mounted upon the stator and rotor respectively. The secondary includes a coil 3 on the stator and a coil 4 on the rotor. The stator is made in two parts, 5 and 6, the part 6 being supported by an arm 7, pivoted at 8. The rotor 9 is supported upon a pair of shafts 10, which extend through bearings 11 in the stationary part 5 of the stator.

The primary winding includes the coil 1 in a channel in the movable part 6 of the stator and a coil 2 in one channel in the rotor 9. Rotation of the shaft 10 in the bearings 11, therefore, causes the total inductance in the primary to be altered just as is usual in variometers. Because the coil 2 is necessarily of smaller diameter than the coils on the stator, this coil includes a few more turns than the coil 1 which forms the other part of the primary. This is desirable in order that the inductance of the two halves of the primary shall be nearly equal, whereby, when the two halves of the primary are positioned to oppose each other, the total inductance in the primary will be nearly zero.

In the same way, the coils 3 and 4, which, together, constitute the secondary, have the number of their turns so apportioned that, when they are in opposition, the total inductance in the secondary is nearly zero.

The part 6 of the stator may be moved to the position illustrated in Fig. 3, where the coil 1 is no longer closely coupled with the rotor. This will diminish the coupling between half of the primary winding and the secondary winding. If the coupling between this portion of the primary and the secondary be reduced nearly to zero, a very considerable change in the coupling of the whole primary to the secondary is obtained.

In the preceding description, the words primary and secondary have been used merely for readily identifying the windings. It is obvious that either side of the transformer may be the input circuit and the other side will then be the output circuit.

In the form of the device illustrated in Fig. 2, the shaft 10 is mounted in bearings 11 in the stationary part 25 of the stator, which also has a movable part 26. The primary, including two coils 21 and 22, and the secondary, including two coils 23 and 24, are related as already described in connection with Fig. 1.

The stator 29 has a spherical contour and the external surfaces of the coils 22 and 24 are spherical. The bottoms of the channels for coils 23 and 21 are likewise spherical and these surfaces are concentric with the outer surfaces of the other coils. In this way, a much closer spacing between the stator and the rotor may be obtained than is possible with the form shown in Fig. 1. The distribution of inductance among the several portions of the windings is the same and the effect of the movement of the rotor and of the movable part of the stator is the same as explained in connection with Fig. 1.

In Fig. 3, a modification is shown in which the inductance of one winding only is varied. The stator contains channels 32 and 33 in which the coils constituting one-half of the winding are formed. A connection 30, extending through the shaft 38, leads to the coils in the channels 34 and 35 on the rotor 37. At the other terminal of the rotor winding, there is a connection 31 similar to the connection 30. The other winding of the transformer comprises a coil in a channel 39, which is in a movable member 40, that is, mounted upon an arm 41, pivoted at 42.

Movement of the member 40 regulates the coupling between the two windings. Movement of the shaft 38 regulates the inductance in one of the windings. No provision is made in this modification for adjusting the inductance in the other winding or for maintaining any predetermined relation between the inductances of the two windings.

Many modifications will be obvious to those skilled in the art and the specific illustration and description of these three modifications is not to be construed as a limitation. No limitation is intended except what is required in the prior art or indicated in the claims.

I claim as my invention:

1. In a transformer means for simultaneously varying the inductances of the primary and of the secondary in like ratios and means for varying the coupling independently of the variation in the inductances.

2. In a transformer, a rotor, a stator and a pair of bearings in the stator in which the rotor is mounted, the stator being in two parts, one of which is stationary relative to said bearings, the other of said parts being mounted for movement relative to said bearings.

3. In a transformer, a rotor, a stator, a pair of bearings in the stator in which the rotor is mounted, the stator being in two parts, one of which is stationary relative to said bearings, the other of said stator parts being mounted on a member rotatable about an axis substantially perpendicular to a plane which includes the axis of rotation of said rotor and the axis of said stationary stator part.

4. In a transformer, a primary winding, a secondary winding, each of said windings comprising two coils, a rotor, a stator comprising a plurality of separable portions, one coil of each of said windings being carried by the rotor, the other coil of each of said windings being carried by the stator, and means for varying the space relation of said separable stator portions to each other, whereby the inductance of said primary and secondary windings may be simultaneously varied, and the coupling of said primary to said secondary also varied if desirable.

In testimony whereof, I have hereunto subscribed my name this 28th day of April, 1924.

ARTHUR EDWIN LEIGH SCANES.